S. B. HOLLY & J. JONES.
Cultivator.
No. 214,138. Patented April 8, 1879.
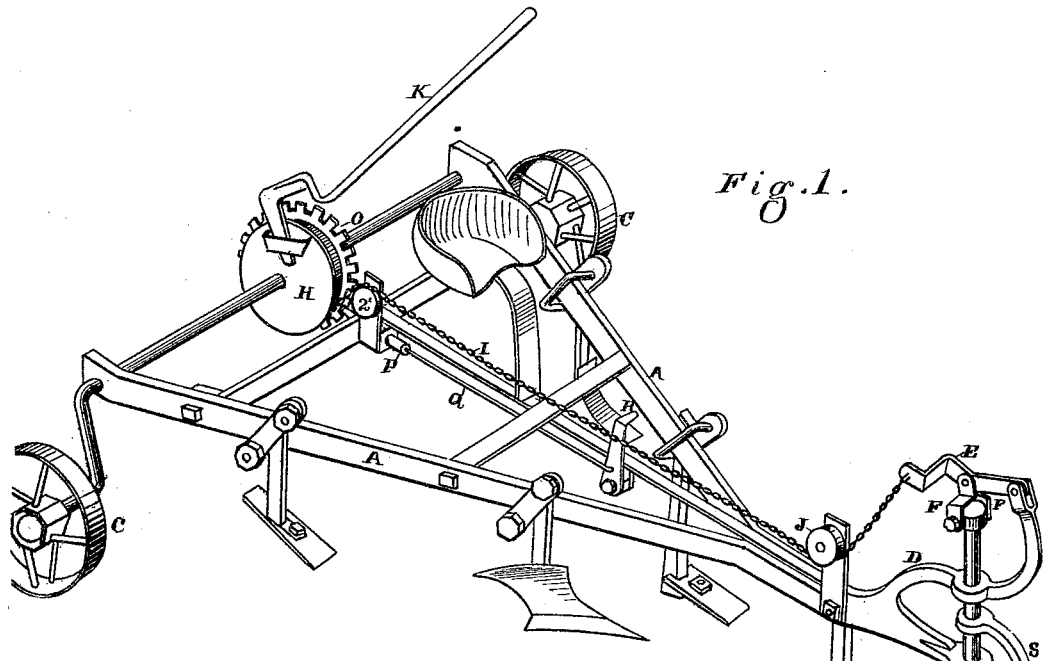
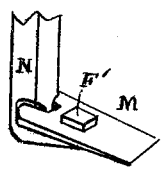
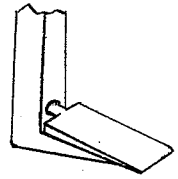
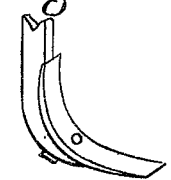
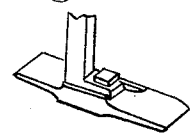
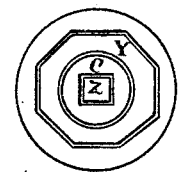
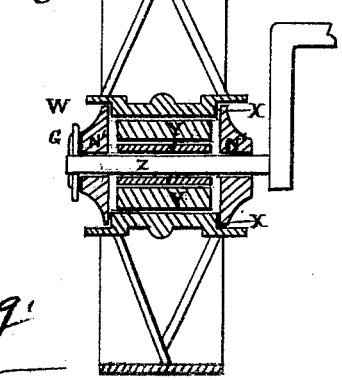
Witnesses
Geo. H. Strong
Frank A. Brooks
Inventors
Sidney B. Holly
John Jones
By their Atty's
Dewey & Co.

UNITED STATES PATENT OFFICE.

SIDNY B. HOLLY AND JOHN JONES, OF STONY POINT, CALIFORNIA.

IMPROVEMENT IN CULTIVATORS.

Specification forming part of Letters Patent No. 214,138, dated April 8, 1879; application filed February 26, 1878.

*To all whom it may concern:*

Be it known that we, SIDNY B. HOLLY and JOHN JONES, of Stony Point, county of Sonoma, and State of California, have invented an Improvement in Cultivators; and we do hereby declare the following to be a full, clear, and exact description thereof, reference being had to the accompanying drawings.

Our invention relates to certain improvements upon the cultivator for which Letters Patent No. 191,347 were issued to John Jones on the 20th day of May, 1877.

Our improvements consist in the combination of devices hereinafter explained and claimed.

Referring to the accompanying drawings, Figure 1 is a perspective view of our plow. Figs. 2, 3, 4, and 5 show different methods of receiving the tooth or chisel. Fig. 6 is a section of wheel.

The frame A is made triangular, as described in John Jones's patent, above referred to; and it is supported by the caster-wheel B in front and the two bearing-wheels C C at the rear, in the usual manner. D is the arm or brace through which the upper end of the caster-wheel spindle passes. E is the lever, which is pivoted at its middle, between the two legs F F, on the top of the caster-wheel spindle, so that one arm extends forward and is attached to the upturned extremity of the arm or brace B, while its opposite arm projects toward the rear, as represented.

Instead of employing a rod for connecting the rear end of this lever with an arm of the crank-axle G, as in John Jones's patent, we secure a pulley, H, on the axle, and connect it with the rear end of the lever E by a chain or rope, I. This chain or rope has one end attached to the pulley H, and the rope or chain then passes forward under the pulley, thence it passes over a pulley, 2', thence forward under another pulley, J, near the front end of the frame, and then up to the rearward-projecting end of the lever E, to which it is attached.

The pulley H has one of its flanges made of larger diameter than the other, and this flange is provided with a number of notches, O, so as to form it into a circular rack, as represented. A spring-latch, P, is mounted in the cross-beam of the frame, so as to be projected into whichever one of the notches is brought opposite it. This spring-latch is connected by a rod, Q, with a foot-lever, R, which is convenient to the foot of the driver, so that he can, by pressing his foot upon the lever, draw the latch.

K is a lever, which is attached to the pulley H, and is bent forward so as to be within easy reaching distance of the driver when he is sitting on the seat L, so that when the latch is drawn he can, by pressing down upon the lever, rotate the pulley, and thus simultaneously raise the entire frame and plows. This lever K can be detached from the pulley H and reversed, so as to project toward the rear, and be fastened in this position as before, so as to serve the same purpose when the driver is walking and driving, in which case we connect the spring-latch with it, so that both can be operated at once. This arrangement is very convenient, and enables the driver to relieve himself by walking whenever he desires.

The clevis S, which we use is fixed to the spindle of the caster-wheel, so that the wheel is shifted easily by the pull of the team.

The cultivator tooth or chisel M we attach to the foot of the standard N by a bolt, F', which passes down through the foot, and its rear end we interlock with a notch or socket in the lower end of the standard at its junction with the standard-foot. This can be done by making a V-shaped notch in the rear end of the chisel or tooth, and forming a corresponding notch, V, in the standard, so that they interlock with each other; or a projection could be made on the rear end of the tooth, which enters a hole or socket in the standard. These two fastenings will hold the tooth firmly in place.

The chisels can be made double-pointed, so as to be reversed when they become dull, and we shall usually cast them of cast-steel.

It is evident that the fastening is equally adapted to the curved and straight teeth, while the notch or a dovetail mortise and tenon holds the tooth in position and prevents its turning.

The wheels C C we make with stagger-spokes, and we provide the hub W with a recess, X, at each end. The bore or interior of this hub we make square or irregular in form. In the present instance it is represented as octagonal. We then fit inside of this octagonal passage a box, Y, the bore of which is circular, while its exterior is made to correspond with and fit in the octagonal passage. This box extends only to the recess in each end of the hub.

The journal Z, upon which the wheel is placed, we make square or polygonal, and upon it we fit a sleeve, G, over which the box Y will fit in placing the wheel on the journal. We first place a cap, N', on the square axle or journal, then slip on the sleeve G. We then slip the wheel, with its box, in place over the sleeve, and place another cap, N', over the square axle outside the hub. These caps fit in the recesses in the ends of the hub, and prevent the entrance of dust or dirt to the bearing-surfaces. We then secure the wheel on the journal by a linchpin, G, which passes through the axle outside of the cap N'.

We thus provide removable wearing parts, which may be renewed whenever desired.

Having thus described our invention, what we claim, and desire to secure by Letters Patent, is—

The wheel-hub W, provided with an irregular bore and recess, X, at each end, and having the box Y, made to fit in the irregular bore, in combination with the square journal Z, with its sleeve G, and the caps N' N', all combined and arranged substantially as and for the purpose described.

In witness whereof we have hereunto set our hands.

SIDNY B. HOLLY.
JOHN JONES.

Witnesses:
E. S. LIPPITT,
S. C. ST. JOHN.